United States Patent
Sato

(10) Patent No.: US 8,904,055 B2
(45) Date of Patent: Dec. 2, 2014

(54) SWITCHING CONTROL DEVICE AND SWITCHING CONTROL METHOD

(75) Inventor: Mitsuru Sato, Machida (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/599,418

(22) Filed: Aug. 30, 2012

(65) Prior Publication Data
US 2013/0111075 A1    May 2, 2013

(30) Foreign Application Priority Data

Oct. 31, 2011    (JP) .................. 2011-239433

(51) Int. Cl.
G06F 3/00    (2006.01)
G06F 13/40    (2006.01)
H04L 12/24    (2006.01)

(52) U.S. Cl.
CPC ............... *G06F 13/40* (2013.01); *H04L 41/00* (2013.01)
USPC ........................................................... 710/16

(58) Field of Classification Search
CPC .......................................... H04L 41/02–41/08
USPC ............................................................ 710/16
See application file for complete search history.

(56) References Cited

U.S. PATENT DOCUMENTS

| 8,305,879 B2 * | 11/2012 | Gregg ........................... 370/217 |
| 2007/0239925 A1 * | 10/2007 | Koishi .......................... 710/316 |
| 2008/0040526 A1 | 2/2008 | Suzuki et al. |

FOREIGN PATENT DOCUMENTS

| JP | 2007-280237 | 10/2007 |
| JP | 2008-46722 | 2/2008 |

* cited by examiner

*Primary Examiner* — Titus Wong
(74) *Attorney, Agent, or Firm* — Staas & Halsey LLP

(57) ABSTRACT

There is provided a switching control device configured to control switching of an access of a host computer communicating with a first switch connected to a first input/output device and a second switch connected to a second input/output device, the switching control device including: a monitor configured to monitor an access of the host computer to the first computer; a memory controller configured to extract setting information to be set in the first switch from the monitored access, the setting information being used to couple the first input/output devices with the host computer, the extracted setting information being stored; a setting controller configured to set the stored setting information into the second switch; and a switching controller configured to switch an access destination of the host computer from the first switch to the second switch, when a fault occurs in the first switch.

5 Claims, 9 Drawing Sheets

SWITCHING CONTROL DEVICE AND SWITCHING CONTROL METHOD

CROSS-REFERENCE TO RELATED APPLICATION

This application is based upon and claims the benefit of priority of the prior Japanese Patent Application No. 2011-239433, filed on Oct. 31, 2011, the entire contents of which are incorporated herein by reference.

FIELD

The embodiments discussed herein are related to a switching control device and a switching control method.

BACKGROUND

Associated with increasingly higher performances of computers, a demand for higher performances of inputs and outputs also increases, and thus high speed input and output interfaces, such as PCI (peripheral component interconnect) Express, are utilized.

In general, PCI Express is a standard for an interface connecting a CPU (central processing unit) to a peripheral device inside a computer, while an approach to extend to outside a computer is also utilized in recent years. PCI Express connects input/output devices in Point-to-Point fashion, so that it is difficult to connect a plurality of input/output devices by extending a single bus as a PCI bus. Therefore, it is carried out to connect a single PCI Express link extended from a computer main body with a PCI Express switch to connect this PCI Express switch to a plurality of input/output devices.

Since PCI Express is originally a standard for an interface used inside a computer, devices connected over PCI Express often use an identical power supply. Accordingly, in a case of replacing a PCI Express switch or an input/output device set outside a computer, a power supply of the computer itself is often stopped. Since turning off and on the power supply greatly influences systems and services, it is difficult to replace an I/O (input/output) expansion box in association with turning off and on the power supply in a current situation.

Therefore, there is a technique of providing redundancy for a switch that connects a plurality of host computers to PCI Express slots to have input/output devices installed therein to suppress stopping of systems and services when the switch fails. There is also HotPlug allowing to plug and unplug an input/output device while powered on. HotPlug includes processing of HotRemove and HotAdd. HotRemove is to disable a target input/output device to turn off the power supply for the PCI Express slot to be connected to the target input/output device. HotAdd is to turn on, when a new input/output device is inserted into a PCI Express slot, the power supply for the target slot to execute initialization of the input/output device.

Such techniques in the past are found in, for example, Japanese Laid-open Patent Publication No. 2007-280237 and Japanese Laid-open Patent Publication No. 2008-46722.

SUMMARY

According to an aspect of the embodiment, there is provided a switching control device configured to control switching of an access of a host computer communicating with a first switch connected to a first input/output device and a second switch connected to a second input/output device, the switching control device including: a monitor configured to monitor an access of the host computer to the first computer; a memory controller configured to extract setting information to be set in the first switch from the monitored access, the setting information being used to couple the first input/output devices with the host computer, the extracted setting information being stored; a setting controller configured to set the stored setting information into the second switch; and a switching controller configured to switch an access destination of the host computer from the first switch to the second switch, when a fault occurs in the first switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

There are many points to consider in the use of a memory space for using HotPlug or the like when replacing a PCI Express switch, and it is considered that stopping of the power supply for the host computer is difficult to be suppressed. This problem is not limited to a PCI Express switch but there is also a similar problem for other switches connecting a host computer to input/output devices.

For example, it is considered to apply HotPlug to a PCI Express switch. A host computer accesses an input/output device with HotAdd of HotPlug and reads information stored in a configuration register to extract an I/O region to be used by the input/output device. Then, the host computer secures the I/O region thus extracted of the input/output device in the memory space of the host computer with HotAdd. The host computer writes the I/O region secured in the memory space in the configuration register with HotAdd. Thus, the host computer accesses the input/output device through the I/O region thus secured.

When applying this approach to a PCI Express switch, a host computer extracts each I/O region of input/output devices connected to the PCI Express switch and secures continuous regions of not less than a total of the I/O regions thus extracted in the memory space of own device. Accordingly, the I/O space desired for the PCI Express switch becomes large, and furthermore continuous regions have to be allocated. For that reason, it is difficult to dynamically secure an I/O space for a PCI Express switch at the time of HotAdd. Therefore, it is not realistic to control a PCI Express switch with HotPlug.

A detailed description is given below to embodiments of a switching control device and a switching control method disclosed herein based on the drawings. The embodiments do not limit the present disclosure.

First Embodiment

Figure 1:
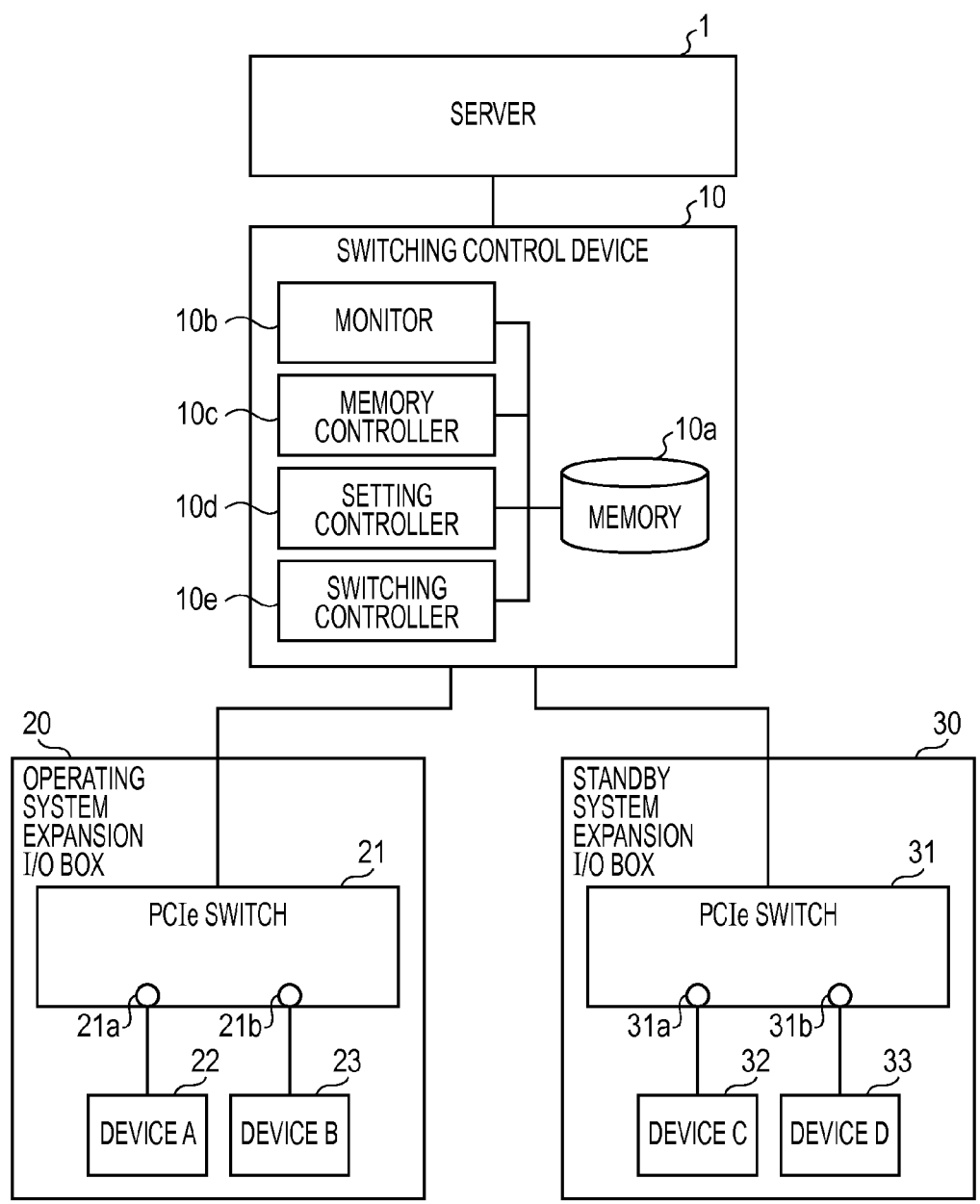
FIG. 1 is a drawing illustrating an entire configuration example of a system including a switching control device according to First Embodiment.

FIG. 1 is a drawing illustrating an entire configuration example of a system including a switching control device according to First Embodiment. As illustrated in FIG. 1, the system has a server 1, a switching control device 10, an operating system I/O (input/output) expansion box 20, and a standby system I/O (input/output) expansion box 30. The switching control device 10 is implemented as, for example, an adapter of the server 1, while the server 1 and the switching control device 10 may also be implemented in separate housings and all or part of the switching control device 10 may also be incorporated into the server 1. The number of servers, the number of switching control devices, and the like may also be set optionally.

The server 1 is connected to the switching control device 10 over PCI Express. Similarly, the switching control device 10 is connected to a PCI Express switch (hereinafter, referred to as a PCIe switch) 21 of the operating system I/O expansion box 20 over PCI Express, and the switching control device 10 is connected to a PCIe switch 31 of the standby system I/O expansion box 30 over PCI Express. That is, the server 1 is connected respectively to the switching control device 10, the operating system I/O expansion box 20, and the standby system I/O expansion box 30 with a PCI Express extension cable, which is an extension of a PCI bus inside the server 1.

The server 1 is a host computer executing an exchange of data with an I/O device connected to the operating system I/O expansion box 20 or the standby system I/O expansion box 30 via the switching control device 10. For example, the server 1 receives data from a device A 22 of the operating system I/O expansion box 20 and writes data in a device B 23 of the operating system I/O expansion box 20. An example of the server 1 includes a rack-mount server and a blade server.

The operating system I/O expansion box 20 is one of units of managing an I/O (input/output) device used by the server 1 at this time, and has the PCIe switch 21, the device A 22, and the device B 23. The number of PCIe switches and the number of devices are not limited to those illustrated and are set optionally, and the number of slots involved in the PCIe switch 21 is also not limited to the illustration and may be set optionally.

The PCIe switch 21 is a PCI Express switch connecting a slot 21a to the device A 22 and connecting a slot 21b to the device B 23. For example, the PCIe switch 21 receives an access from the server 1 to the device A 22 via the switching control device 10 and outputs the access thus received to the device A 22. The PCIe switch 21 is also compatible with HotPlug and allows a device to be plugged and unplugged into/from a slot in a powered on condition.

The device A 22 and the device B 23 are I/O devices used by the server 1 at this time, and an example of them includes a hard disk controller, a network interface card (NIC), and a graphics accelerator.

The standby system I/O expansion box 30 is one of units of managing an I/O device that runs as a standby system of the operating system I/O expansion box 20, and has the PCIe switch 31, a device C 32, and a device D 33. The number of PCIe switches and the number of devices are not limited to those illustrated and may be set optionally, and the number of slots involved in the PCIe switch 31 is also not limited to the illustration and may be set optionally.

The PCIe switch 31 is a PCI Express switch connecting a slot 31a to the device C 32 and connecting a slot 31b to the device D 33. For example, the PCIe switch 31 receives an access from the server 1 to the device D 33 via the switching control device 10 and outputs the access thus received to the device D 33. The PCIe switch 31 is also compatible with HotPlug and allows a device to be plugged and unplugged into/from a slot in a powered on condition.

The device C 32 is an I/O device used by the server 1, and runs as a standby system of the device A 22. The device D 33 is an I/O device used by the server 1, and runs as a standby system of the device B 23. For examples of the device C 32 and the device D 33, the devices similar to those of the device A 22 and the device B 23 may be used.

The switching control device 10 has a memory 10a, a monitor 10b, a memory controller 10c, a setting controller 10d, and a switching controller 10e, and is a device to relay an access outputted from the server 1 to the device, and executes switching from the operating system to the standby system when the operating system fails.

The monitor 10b monitors the access executed from the server 1 to the PCIe switch 21 of the operating system I/O expansion box 20 connected to an I/O device. The memory controller 10c extracts setting information, set in the PCIe switch 21 by the server 1 to connect the server 1 to an I/O device, from the monitored access to memorize it in the memory 10a. The setting controller 10d sets the setting information, memorized in the memory 10a, in the PCIe switch 31 of the standby system I/O expansion box 30 to be connected to an I/O device. The switching controller 10e switches an access destination of the server, when a fault occurs in the PCIe switch 21 of the operating system, from the PCIe switch 21 of the operating system to the PCIe switch 31 of the standby system.

In such a manner, the switching control device 10 extracts the setting information set in the PCIe switch 21 from the access executed by the server 1 to the PCIe switch 21 used as the operating system for retention. Then, the switching control device 10 executes settings same as the PCIe switch of the operating system to a PCIe switch having unset connection to an I/O device. Accordingly, the switching control device 10 switches, even when the PCIe switch of the operating system fails, into the PCIe switch of the standby system without executing settings or reboot of the server 1. As a result, it is possible to suppress the stopping of the power supply for the server 1 when replacing the PCIe switch connecting the server 1 to an I/O device.

Figure 2:
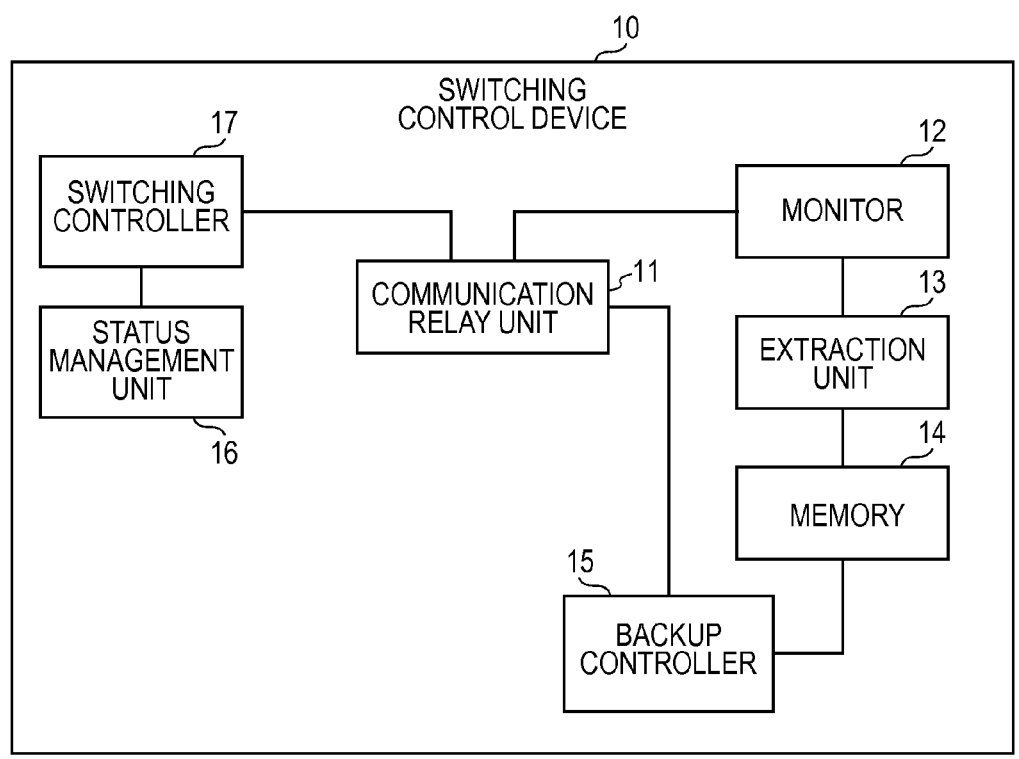
FIG. 2 is a functional block diagram illustrating a configuration of the switching control device according to First Embodiment.

FIG. 2 is a functional block diagram illustrating a configuration of the switching control device according to First Embodiment. As illustrated in FIG. 2, the switching control device 10 has a communication relay unit 11, a monitor 12, an extraction unit 13, a memory 14, a backup controller 15, a status management unit 16, and a switching controller 17. The communication relay unit 11, the monitor 12, the extraction unit 13, the backup controller 15, the status management unit 16, and the switching controller 17 may be, for example, an electronic circuit, such as a CPU (central processing unit), or an integrated circuit, such as an FPGA (field-programmable gate array). The memory 14 may be, for example, a memory device, such as a semiconductor memory device.

The communication relay unit 11 is a processing unit to relay the access received from the server 1 to the PCIe switch connected to an I/O device. For example, when accepting an access, such as writing of data and reading of data, from the server 1, the communication relay unit 11 outputs the accepted access to the PCIe switch specified by the switching controller 17. In a case of referring to FIG. 1, the communication relay unit 11 accepts the access from the server 1 to the device A 22 and outputs the accepted access to the PCIe switch 21. The communication relay unit 11 accepts a response to the access from the PCIe switch 21 and outputs it to the server 1.

The monitor 12 is a processing unit to monitor the access executed from the server 1 to the PCIe switch 21 connected to an I/O device. For example, the monitor 12 monitors the access to be relayed by the communication relay unit 11 from the server 1 to the PCIe switch 21. Then, the monitor 12 extracts a writing request to a register arranged in a configuration space of the PCIe switch 21, that is to say, a configuration register of the PCIe switch 21 and outputs it to the extraction unit 13. The monitor 12 specifies a writing request to a configuration register by a writing destination, a command class, and the like specified in the access.

The monitor 12 outputs, every time extracting a writing request to a configuration register, the writing request thus extracted to the extraction unit 13. That is, the monitor 12 detects initial settings and setting modification to the PCIe switch 21 that currently runs as the operating system to extract it to the extraction unit 13.

The extraction unit 13 is a processing unit to extract the setting information set by the server 1 in the PCIe switch 21 to connect the server 1 to an I/O device to memorize it in the memory 14. For example, the extraction unit 13 extracts an I/O region to be used by the PCIe switch 21 from the writing request to the configuration register inputted from the monitor 12 and stores it in the memory 14. That is, the extraction unit 13 extracts settings of an I/O space to be used by the PCIe switch 21, that is to say, PCI bridge settings.

To describe an example, the server 1 secures respective I/O regions of the device A 22 and the device B 23 in the memory space, and writes a region, linking an I/O region used by the bridge so as to include the secured I/O region, in the configuration register of the PCIe switch 21. In this way, the server 1 accesses the device A 22 and the device B 23 through the I/O region secured in the memory space. Here, the extraction unit 13 extracts a starting address and a size of the I/O region to be written by the server 1 in the configuration register of the PCIe switch 21. That is to say, the extraction unit 13 extracts an address map to be written by the server 1 in the PCIe switch 21.

The extraction unit 13 extracts, every time receiving a writing request from the monitor 12, an address map from the writing request thus received and writes it in the memory 14. That is to say, the extraction unit 13 extracts, every time settings in the PCIe switch of the operating system is modified, new setting information and writes it in the memory 14 to follow the setting modification.

The memory 14 is a memory device to memorize the setting information written by the extraction unit 13. For example, the memory 14 memorizes the address map set by the server 1 to the PCIe switch 21. The information memorized by the memory 14 is updated by the extraction unit 13.

The backup controller 15 is a processing unit to set setting information to be stored in the memory 14 in the PCIe switch 31, when an I/O device is connected to the PCIe switch 31. Specifically, the backup controller 15 generates the writing access, executed by the server 1 to the PCIe switch 21 of the operating system, also in the PCIe switch 31 of the standby system without an instruction operation by the server 1. Then, the backup controller 15 executes setting of the address map set in the PCIe switch 21 of the operating system also in the PCIe switch 31 of the standby system.

The backup controller 15 executes settings in the PCIe switch 31 of the standby system every time the setting information memorized in the memory 14 is updated. In this way, the setting modification of the operating system is followed. The backup controller 15 sets the setting information memorized in the memory 14 to a PCIe switch newly connected to the switching control device 10. Accordingly, the backup controller 15 sets, in a case that a PCIe switch of a new standby system is newly connected to the switching control device 10 as an alternative for the old operating system after switching from the operating system to the standby system due to failure, the setting information memorized in the memory 14 to a PCIe switch of the new standby system.

The status management unit 16 is a processing unit to retain which PCIe switch currently runs as the operating system. Referring to FIG. 1, the status management unit 16 retains that the PCIe switch 21 is the operating system. The status management unit 16 updates the retained information as the execution of switching of the PCIe switch is informed from the switching controller 17.

The switching controller 17 is a controller to switch from the PCIe switch of the operating system to the standby system and from the PCIe switch of the standby system to the operating system. For example, the switching controller 17 determines, when detecting failure of the PCIe switch 21, whether or not the failed PCIe switch 21 is of the operating system with reference to the status management unit 16. Then, the switching controller 17 outputs, when the PCIe switch 21 is of the operating system, an instruction to switch the access destination in the server 1 to the PCIe switch 31 of the standby system to the communication relay unit 11. The switching controller 17 also informs the status management unit 16 of the switching of the PCIe switch of the operating system.

As an opportunity of switching in the switching controller 17, there are a case of occurring failure in the PCIe switch of the operating system, a case of occurring disconnection in the PCI Express extension cable connected to the PCIe switch of the operating system, a case of receiving a switching instruction from an administrator or the server 1, and the like. An approach to detect the failure in the switching controller 17 may be acceptance of an instruction directly from the administrator, may also be acceptance from the server 1, and may also be a general detection approach, such as regular communicating confirmation and an access error.

Figure 3:
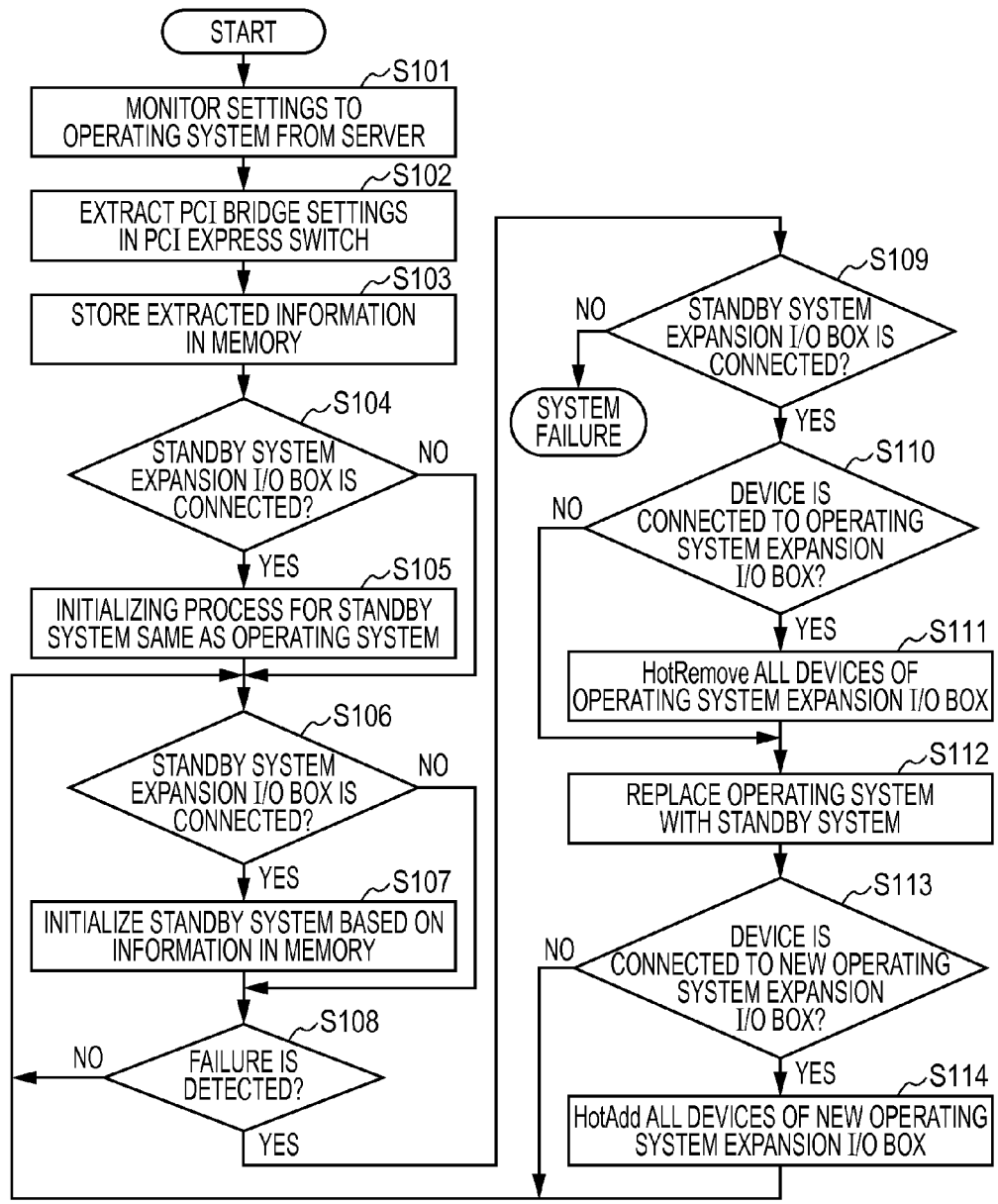
FIG. 3 is a flowchart representing a flow of processing executed by the switching control device according to First Embodiment.

FIG. 3 is a flowchart representing a flow of processing executed by the switching control device according to First Embodiment. As represented in FIG. 3, the monitor 12 of the switching control device 10 monitors, as powered on, an access relayed by the communication relay unit 11 from the server 1 to the operating system I/O expansion box 20 to monitor the settings in the operating system from the server (S101). That is, the monitor 12 monitors initializing process executed by the server 1 to the PCIe switch 21 of the operating system.

The extraction unit 13 extracts the PCI bridge settings in the PCIe switch 21 of the operating system from the access obtained by the monitor 12 (S102). Subsequently, the extraction unit 13 stores the information of the PCI bridge settings thus extracted in the memory 14 (S103).

Then, the backup controller 15 executes, when the standby system I/O expansion box 30 is connected to the communication relay unit 11 of the switching control device 10 (Yes in S104), initializing process similar to the operating system to the PCIe switch 31 of the standby system I/O expansion box 30 (S105). That is to say, the backup controller 15 sets the setting information, memorized in the memory 14, in the PCIe switch 31 of the standby system I/O expansion box 30. The backup controller 15 executes S106 when the standby system I/O expansion box 30 is not yet connected (No in S104).

After that, the backup controller 15 sets, when a new standby system I/O expansion box is connected (Yes in S106), the setting information memorized in the memory 14 to a PCIe switch of the new standby system I/O expansion box (S107). In contrast, the backup controller 15 executes S108 when a new standby system I/O expansion box is not yet connected (No in S106).

Then, the switching controller 17 determines, as detecting failure in the PCIe switch of the operating system or the like (Yes in S108), whether or not the standby system I/O expansion box 30 is connected via the communication relay unit 11 (S109).

Subsequently, the switching controller 17 determines, when determining that the standby system I/O expansion box 30 is connected (Yes in S109), whether or not an I/O device is connected to the operating system I/O expansion box 20 (S110). The switching controller 17 determines, when determining that the standby system I/O expansion box 30 is not connected (No in S109), as system failure and outputs an alarm or the like on a display or informs the server 1.

Then, the switching controller 17 executes, when determining that an I/O device is connected to the operating system I/O expansion box 20 (Yes in S110), HotRemove to the I/O device connected to the operating system I/O expansion box 20 (S111). After that, the switching controller 17 sends an instruction to the communication relay unit 11 so as to output the access from the server 1 to the standby system I/O expansion box 30 and thus switches from the operating system to the standby system (S112). In S110, when determining that an I/O device is not connected to the operating system I/O expansion box 20 (No in S110), the switching controller 17 executes S112 without executing S111.

Subsequently, the switching controller 17 executes, when an I/O device is connected to the new operating system I/O expansion box 20 (Yes in S113), HotAdd to all devices connected to the new operating system I/O expansion box 20 (S114).

After that, the switching control device 10 repeats the processing of S106 and later. Similarly, in S113, when the switching controller 17 determines that an I/O device is not connected to the new operating system I/O expansion box 20 (No in S113), the switching control device 10 repeats the processing of S106 and later. In addition, in S108, while the switching controller 17 does not detect failure in the PCIe switch of the operating system or the like (No in S108), the switching control device 10 repeats the processing of S106 and later.

Figure 4:
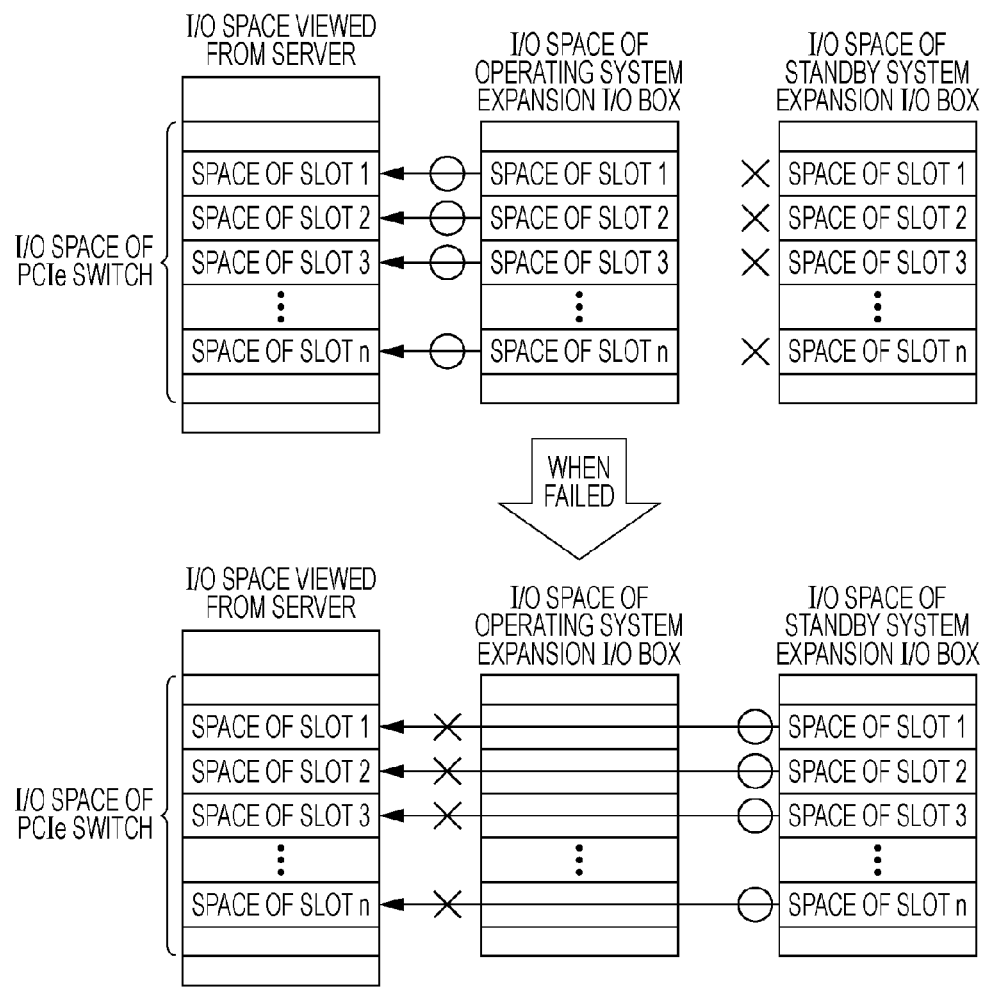
FIG. 4 is a chart illustrating setting processing executed by the switching control device according to First Embodiment.

FIG. 4 is a chart illustrating setting processing executed by the switching control device according to First Embodiment. As illustrated in an upper part of FIG. 4, the server 1 extracts the I/O region used by the I/O device of the operating system I/O expansion box 20, and secures the I/O region of the I/O device thus extracted in the memory space. Then, the server 1 writes the I/O region secured in the memory space in the configuration register of the PCIe switch 21. By processing in such a manner, it is possible to correspond the I/O space (address space) of the I/O device secured in the memory space of the server 1 to the I/O space of the I/O device written in the configuration register of the PCIe switch 21 of the operating system I/O expansion box 20.

Then, the switching control device 10 extracts the region of the I/O device written in the configuration register of the PCIe switch 21 of the operating system I/O expansion box 20 and writes it in the configuration register of the PCIe switch 31 of the standby system I/O expansion box 30. That is to say, the switching control device 10 further corresponds the address space of the I/O device secured in the memory space of the server 1 to the address space of the I/O device written in the configuration register of the PCIe switch 31.

By processing in such a manner, it appears as if the I/O space viewed from the server 1 corresponds to the I/O space of each slot involved in the PCIe switch 21 of the operating system. However, in reality, the I/O space secured in the memory space of the server 1 corresponds to the I/O space of each slot involved in the PCIe switch 21 of the operating system and the I/O space of each slot involved in the PCIe switch 31 of the standby system.

In such a condition, the access destination of the server 1 is assumed to be switched from the PCIe switch 21 of the operating system to the PCIe switch 31 of the standby system. Even in this case, as illustrated in a lower part of FIG. 4, the I/O space of each slot already involved in the PCIe switch 31 of the standby system is corresponded to the I/O space secured in the memory space of the server 1. Accordingly, the server 1 accesses, not aware of the switching of the PCIe switch of the access destination, the I/O device connected to the PCIe switch 31 through the I/O space in the memory space.

After that, as the switching control device 10 detects that a new standby system I/O box is connected instead of the failed old operating system I/O box, the I/O space set in the PCIe switch of the old operating system I/O box is set for the PCIe switch of the new standby system I/O box. In this way, it is also possible to add a PCIe switch for the standby system without executing a stop or reboot of the server 1.

In such a manner, the switching control device 10 extracts the setting information set in the PCIe switch 21 used for the operating system regardless of an instruction of the server 1 or the like to execute settings to an unset PCIe switch same as the PCIe switch of the operating system. Accordingly, even when the PCIe switch of the operating system fails, the switching control device 10 switches to the PCIe switch of the standby system without executing settings and reboot of the server 1.

The switching control device 10 executes HotRemove to the slots of the failed operating system to invalidate each slot and turns off the power supply for the slots, followed by executing HotAdd to the slots of the standby system to switch from the operating system to the standby system. Therefore, the switching control device 10 resets the information regarding the slots of the operating system, and thus it is possible to decrease defects in a case of validating a slot of the standby system.

Since the switching control device 10 follows the setting modification of the PCIe switch 21 of the operating system, latest information also is set in the PCIe switch 31 of the standby system. Since the switching control device 10 sets the information set in the PCIe switch of the operating system every time a PCIe switch of the standby system is connected, it is possible to easily add a standby system. Since the server 1 may be set for one PCIe switch, it is also possible to reduce responsibility of the administrator or the like related to settings.

Second Embodiment

While First Embodiment describes a case of switching to a PCIe switch of the standby system when the PCIe switch of the operating system fails, Second Embodiment describes an example of switching only from a failed slot to the standby system.

Figure 5:
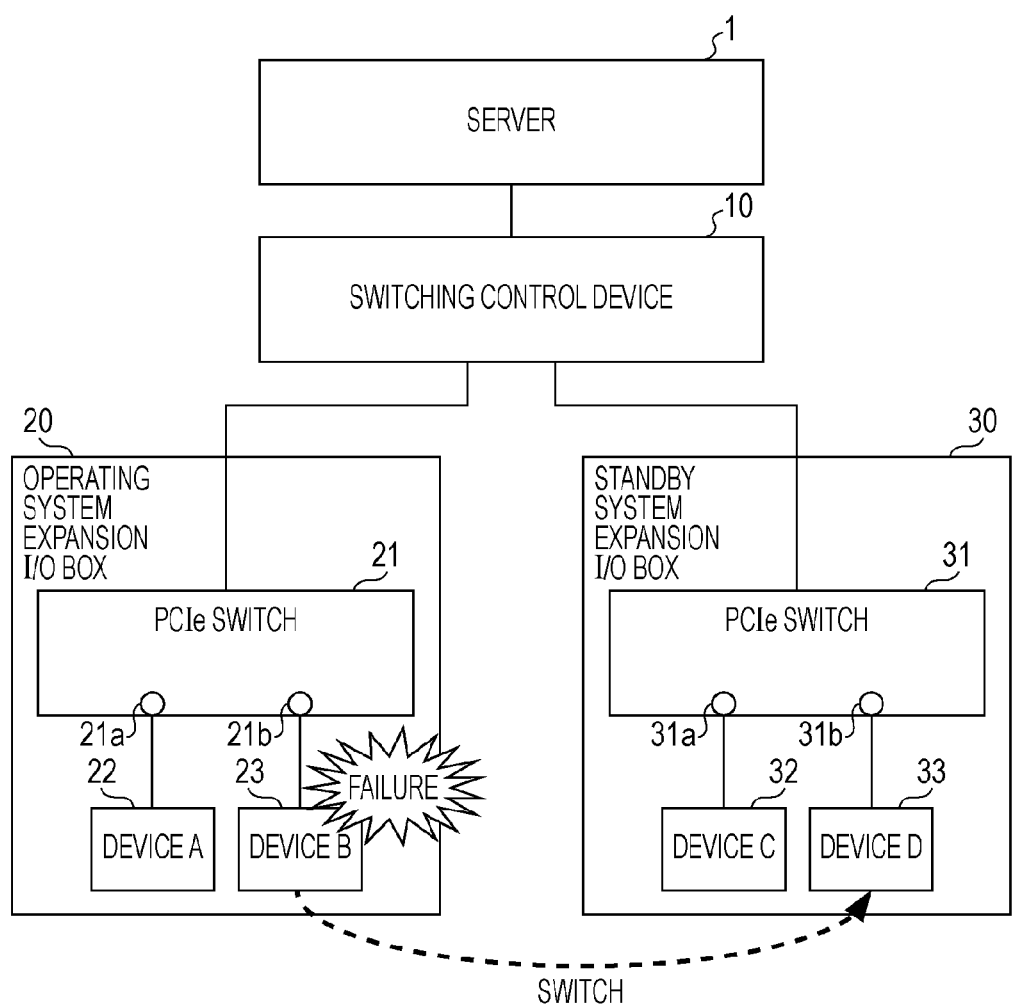
FIG. 5 is a drawing illustrating a switching control device according to Second Embodiment.

FIG. 5 is a drawing illustrating a switching control device according to Second Embodiment. A system illustrated in FIG. 5 has, similar to First Embodiment, a server 1, a switching control device 10, an operating system I/O expansion box 20, and a standby system I/O expansion box 30. The description of each device is omitted as it is similar to First Embodiment.

In Second Embodiment, the switching control device 10 detects a fault for the device B 23 connected to the slot 21b involved in the PCIe switch 21 of the operating system by canalization confirmation, an access error, and the like. With that, the switching control device 10 specifies the slot 31b involved in the PCIe switch 31 of the standby system as the slot corresponding to the slot 21b having the detected fault. To describe an example, the switching control device 10 specifies the slot 31b by comparing the I/O space for each slot set in the configuration register of the PCIe switch 21 with the I/O space for each slot set in the configuration register of the PCIe switch 31.

Then, the switching control device 10 switches from the device B 23 connected to the slot 21b of the PCIe switch 21 of the operating system to the device D 33 connected to the slot 31b of the PCIe switch 31 of the standby system. That is to say, the switching control device 10 sends, when receiving an access from the server 1 to the device B 23, the access to the device D 33. Specifically, the switching control device 10 sends the access to the I/O region of the device B 23 set in the PCIe switch 31 to the device D 33.

Figure 6:
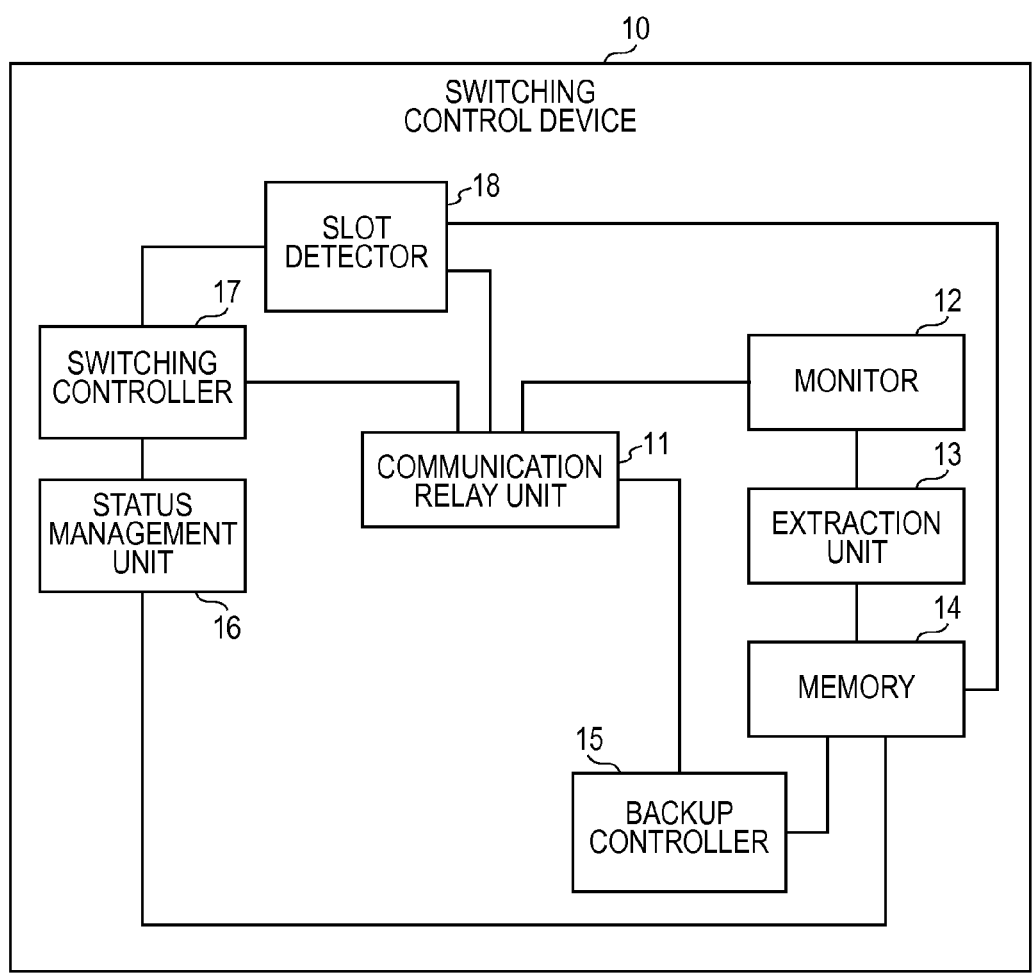
FIG. 6 is a functional block diagram illustrating a configuration of the switching control device according to Second Embodiment.

FIG. 6 is a functional block diagram illustrating a configuration of the switching control device according to Second Embodiment. As illustrated in FIG. 6, the switching control device 10 according to Second Embodiment has the communication relay unit 11, the monitor 12, the extraction unit 13, the memory 14, the backup controller 15, the status management unit 16, the switching controller 17, and a slot detector 18.

The communication relay unit 11, the monitor 12, the extraction unit 13, the backup controller 15, the status management unit 16, the switching controller 17, and the slot detector 18 are, for example, an electronic circuit, such as a CPU, or an integrated circuit, such as an FPGA. The memory 14 is, for example, a memory device, such as a semiconductor memory device.

The communication relay unit 11, the monitor 12, the extraction unit 13, the memory 14, the backup controller 15, the status management unit 16, and the switching controller 17 have functions similar to First Embodiment, so that detailed descriptions are omitted. Here, a description is given to the slot detector 18, which is a function different from First Embodiment.

The status management unit 16 retains the operating system and the standby system in relation to each other for each slot. For example, the status management unit 16 memorizes information representing whether the slot is of the operating system or of the standby system for each slot of each switch. In addition, the extraction unit 13 and the backup controller 15 generate compatibility between the I/O region for each slot set in the PCIe switch 21 and the I/O region for each slot set in the PCIe switch 31 to store it in the memory 14.

The slot detector 18 is a processing unit to detect the access from the server 1 accesses to which slot. For example, the slot detector 18 specifies the slot of the access destination from a device name contained in the access of the server 1. The slot detector 18 also specifies the slot of the access destination by comparing the I/O region accessed by the server 1 with the address map or the like memorized in the memory 14 and specifying the I/O region subjected to the access.

For example, the slot detector 18 detects the slot 21b of the access destination, and the switching controller 17 detects occurrence of a fault in the slot 21b of the access destination when there is no response from the access destination. Then, the switching controller 17 outputs an instruction to switch the access to the slot 21b involved in the PCIe switch 21 of the operating system having the detected fault to the slot 31b involved in the PCIe switch 31 of the standby system to the communication relay unit 11. After that, the communication relay unit 11 sends, when the server 1 accesses the device B 23, the access to the device D 33.

Figure 7:
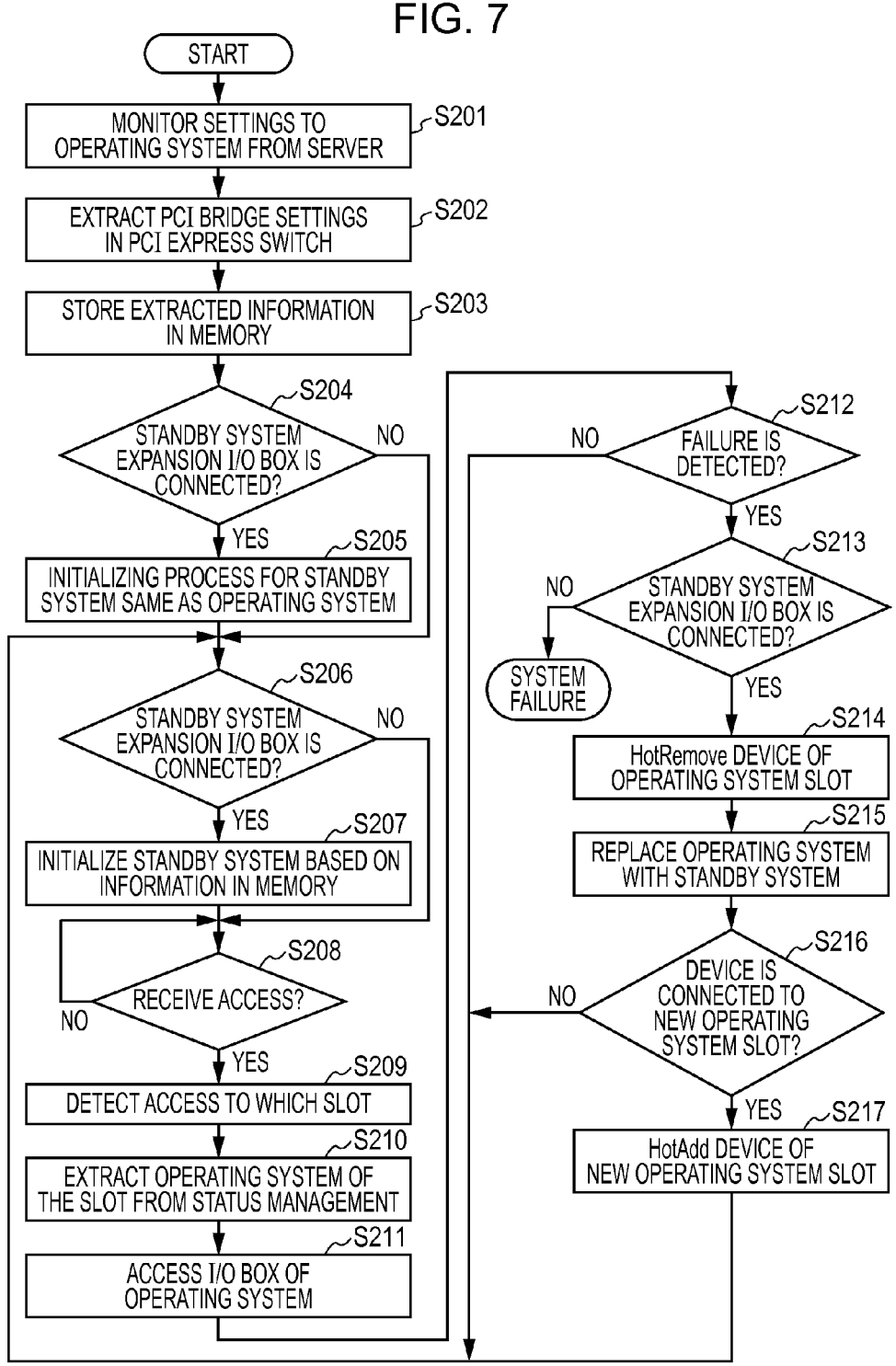
FIG. 7 is a flowchart representing a flow of processing executed by the switching control device according to Second Embodiment.

FIG. 7 is a flowchart representing a flow of processing executed by the switching control device according to Second Embodiment. The processing from S201 to S207 illustrated in FIG. 7 is processing similar to from S101 to S107 in FIG. 3 described in First Embodiment, so that the descriptions are omitted here.

Then, when the communication relay unit 11 detects an access (Yes in S208), the slot detector 18 detects to which slot the access destination of the detected access is (S209). Subsequently, the switching controller 17 specifies the operating system of the detected slot from the information retained in the status management unit 16 (S210). Then, the communication relay unit 11 sends the received access to the operating system I/O expansion box having the slot thus specified (S211).

To describe a specific example, when the server 1 accesses through a predetermined I/O region in the memory space, the slot detector 18 specifies the slot relevant to the I/O region from the memory 14 and the like. Then, the switching controller 17 refers to the information retained in the status management unit 16 and specifies the slot 21b of the currently operating system in the slot detected by the slot detector 18, that is, in the I/O region detected by the slot detector 18. After that, the communication relay unit 11 sends the access received from the server 1 to the PCIe switch 21 having the slot 21b specified by the switching controller 17.

Returning to FIG. 7, the switching controller 17 determines, when detecting failure in the access destination relayed from the communication relay unit 11 (Yes in S212), whether or not the standby system I/O expansion box is connected (S213). When failure is not detected in the access destination relayed from the communication relay unit 11 (No in S212), the switching control device 10 repeats S206 and later.

The switching controller 17 executes, when determining that the operating system I/O expansion box is connected (Yes in S213), HotRemove to the slot specified in S209 and S210 involved in the operating system I/O expansion box (S214). After that, the switching controller 17 switches from the server 1 to the access destination for the slot specified in S209 and S210 and from the operating system to the standby system (S215).

Subsequently, the switching controller 17 executes, when an I/O device is connected to the relevant slot of the new operating system I/O expansion box (Yes in S216), HotAdd to the relevant slot of the new operating system I/O expansion box (S217).

After that, the switching control device 10 repeats the processing of S206 and later. Similarly, in S216, when the switching controller 17 determines that an I/O device is not connected to the relevant slot of the new operating system I/O expansion box (No in S216), the switching control device 10 repeats the processing of S206 and later.

In S213, the switching controller 17 determines, when determining that the standby system I/O expansion box is not connected (No in S213), as system failure and outputs an alarm or the like on a display or informs the server 1.

Figure 8:
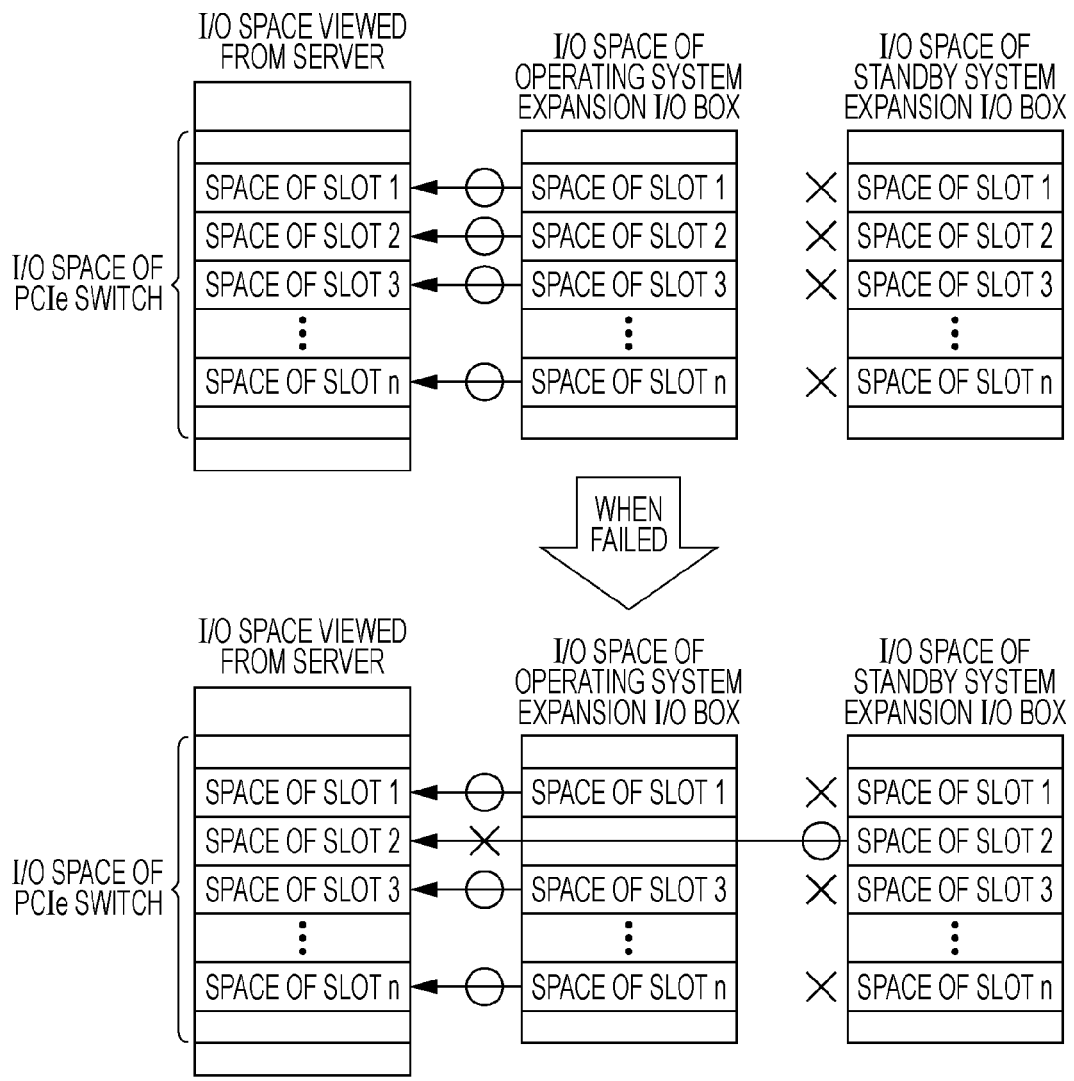
FIG. 8 is a chart illustrating setting processing executed by the switching control device according to Second Embodiment.

FIG. 8 is a chart illustrating setting processing executed by the switching control device according to Second Embodiment. Since an upper part of FIG. 8 is similar to an upper part of FIG. 4, a detailed description is omitted. Specifically, it appears as if the I/O space viewed from the server 1 is corresponded to the I/O space of each slot involved in the PCIe switch of the operating system. In reality, the I/O space secured in the memory space of the server 1 is corresponded to the I/O space of each slot involved in the PCIe switch of the operating system and the I/O space of each slot involved in the PCIe switch of the standby system.

In such a condition, a fault is assumed to occur in a slot 2 of the operating system, which is an access destination of the server 1. In this case, the switching control device 10 switches from the slot 2 having an occurring fault to the standby system by corresponding the I/O space of the slot 2 viewed from the server 1 to the I/O space of the slot 2 of the standby system. Specifically, as illustrated in a lower part of FIG. 8, the I/O space of each slot already involved in the PCIe switch of the standby system is corresponded to the I/O space secured in the memory space of the server 1. Accordingly, it is possible to switch by controlling correspondence inside the switching control device 10. Therefore, the server 1 accesses, not aware of the switching of the slot 2 of the access destination from the operating system to the standby system, the I/O device connected to the relevant slot through the I/O space in the memory space.

By processing in such a manner, even when the I/O device of the operating system fails, it is possible to switch to the standby system only for the failed I/O device, so that the access of the server 1 is processed without stopping the system. In addition, until the failed I/O device is replaced with a new I/O device, it is also possible to process the access of the server 1 normally. Compared with the switching of the PCIe switch itself, it is also possible to reduce risks at the time of switching as the switching is carried out per slot.

Third Embodiment

While the descriptions have been given to the embodiments of the present disclosure, the present disclosure may also be performed in a variety of different forms other than the embodiments described above. With that, different embodiments are described below.

While the embodiments above are described using PCIe switches as examples, they are not limited to the examples and it is possible to apply to, for example, a relay device connecting a host computer to an external input/output device connected by extending a cable from the host computer. It is also possible to apply to a bridge or a switch, which is a switch to carry out switching to an input/output device, to execute settings from the host computer.

The switching control device connects a plurality of standby systems. Accordingly, the switching control device selects, when a fault occurs in the operating system in a situation where a plurality of PCIe switches are connected as standby systems, any switch as a switching destination from the PCIe switches in which initializing process similar to the operating system has been executed. In addition, it is possible to arbitrarily set a standard for selecting the switching destination by the switching control device. For example, the switching control device also selects the switch taking a least time for the initializing process, the switch occurring no error in the initializing process, or the like as the switching destination.

Among each of the processing described in the embodiments, all or part of the processing described as being carried out automatically is also carried out manually. Alternatively, all or part of the processing described as being carried out manually is also carried out automatically in a common method. Other than these, it is possible to optionally modify the information including the processing procedures, the control procedures, the specific names, and the various types of data and parameters represented herein and in the drawings unless otherwise specified.

Each component of each illustrated device is functionally conceptual, and does not have to be physically configured as illustrated. That is, a specific mode of dispersion and integration of each device is not limited to those illustrated. That is to say, it is possible to configure all or part of it by functionally or physically dispersing or integrating in an optional unit. Further, all or any part of each processing function carried out in each device is implemented into a CPU or a program to be analyzed and executed by the CPU or may be implemented into hardware using wired logic.

The various types of processing described in the embodiments above may be implemented by executing a program prepared in advance on a computer system, such as a personal computer and a work station. With that, a description is given below to an example of a computer system executing a program having a function similar to the above embodiments.

Figure 9:
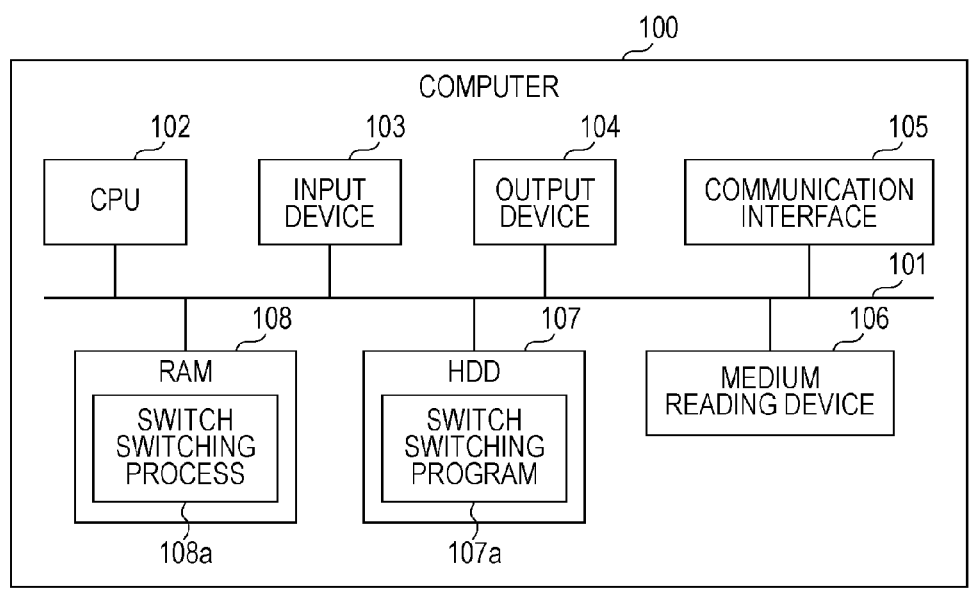
FIG. 9 is a drawing illustrating an example of a hardware configuration of a computer executing a switch switching program.

FIG. 9 is a drawing illustrating an example of a hardware configuration of a computer executing a switch switching program. As illustrated in FIG. 9, a computer 100 has a CPU 102, an input device 103, an output device 104, a communication interface 105, a medium reading device 106, an HDD (hard disk drive) 107, and a RAM (random access memory) 108. Each part illustrated in FIG. 9 is connected to each other with a bus 101.

The input device 103 is a mouse or a keyboard, the output device 104 is a display or the like, and the communication interface 105 is an interface, such as NIC (network interface card). The HDD 107 memorizes information memorized in the memory illustrated in FIG. 2 together with a switch switching program 107*a*. While the HDD 107 is used as an example of a storage medium, various programs may also be stored in another computer readable storage medium, such as a ROM (read only memory), a RAM, and a CD-ROM, to be read by the computer. The storage medium may also be arranged in a remote location to be utilized by obtaining the program by making the computer access the storage medium. At that time, the program thus obtained may also be stored in a storage medium of the computer itself.

The CPU 102 reads the switch switching program 107*a* for expansion in the RAM 108, thereby running a switch switching process 108*a* to execute each function described in FIG. 2, FIG. 6, etc. That is, the switch switching process 108*a* executes functions similar to the communication relay unit 11, the monitor 12, the extraction unit 13, the backup controller 15, the status management unit 16, and the switching controller 17 illustrated in FIG. 2. The switch switching process 108*a* executes functions similar to the slot detector 18 illustrated in FIG. 6. In such a manner, the computer 100 reads the programs for execution, thereby running as an information processing apparatus to execute a switch switching method.

The computer 100 reads the switch switching program from the storage medium by the medium reading device 106 and executes the switch switching program thus read, thereby also enabling functions similar to the embodiments above. The program referred by this embodiment is not limited to be executed by the computer 100. For example, the embodiments may also be applied similarly to a case of executing the program by another computer or server or a case of executing the program in cooperation with them.

The embodiments as mentioned above may suppress stopping of a power supply for a host computer when replacing a switch connecting the host computer to an input/output device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching control device configured to control switching of an access of a host computer communicating with a first switch connected to a first input/output device and a second switch connected to a second input/output device, the switching control device comprising:
    a monitor configured to monitor an access of the host computer to the first switch;
    a memory controller configured to extract setting information to be set in the first switch from the monitored access, the setting information being used to couple the first input/output device with the host computer, the extracted setting information being stored, and extract new setting information every time the setting information in the first switch is modified, the extracted new setting information being stored following the extracted setting information;
    a setting controller configured to set the stored setting information into the second switch before a fault occurs, and update the setting information set in the second switch every time extracted new setting information is stored; and
    a switching controller configured to switch an access destination of the host computer from the first switch to the second switch, when the fault occurs in the first switch.

2. The switching control device according to claim 1, wherein the switching controller is configured to invalidate the first input/output device, control the first switch to turn off a power supply for the first input/output device, control the second switch to turn on a power supply for the second input/output device, and switch the access of the host computer from the first switch to the second switch.

3. The switching control device according to claim 1, further comprising:
    a slot detector configured to detect a slot at which a fault occur among a plurality of slots for which the first switch installs the first input/output device, when the fault occurs in the first switch;
    wherein the switching controller switches the access of the host computer from the slot specified by the slot detector to a slot corresponding to the slot of the first switch specified by the slot detector among the slots included in the second switch.

4. An information processing apparatus configured to control switching of an access to communicating with a first switch connected to a first input/output device and a second switch connected to a second input/output device, the information processing apparatus comprising:
    a monitor configured to monitor the access to the first switch;
    a memory controller configured to extract setting information to be set in the first switch from the monitored access the setting information being used to couple with the first input/output device, the extracted setting information being stored, and extract new setting information every time the setting information in the first switch is modified, the extracted new setting information being stored following the extracted setting information;
    a setting controller configured to set the stored setting information into the second switch before a fault occurs, and update the setting information set in the second switch every time extracted new setting information is stored; and
    a switching controller configured to switch, when the fault occurs in the first switch, an access destination of the host computer from the first switch to the second switch.

5. A non-transitory computer-readable recording medium storing a program that causes a computer to execute a procedure, the procedure comprising:
    monitoring an access of a host computer to a first switch connected to a first input/output device;
    extracting setting information to be set in the first switch, the setting information being used to couple the first input/output device with the host computer, the extracted setting information being stored;
    extracting new setting information every time the setting information in the first switch is modified, the extracted new setting information being stored following the extracted setting information;
    setting the stored setting information into a second switch connected to a second input/output device before a fault occurs;
    updating the setting information set in the second switch every time extracted new setting information is stored; and
    switching an access destination of the host computer from the first switch to the second switch when the fault occurs in the first switch.

* * * * *